(12) United States Patent
Yamamoto et al.

(10) Patent No.: US 6,755,292 B2
(45) Date of Patent: Jun. 29, 2004

(54) END BEARING AND ONE-WAY CLUTCH DEVICE

(75) Inventors: Norihiro Yamamoto, Fukuroi (JP); Hirofumi Ogata, Kakegawa (JP)

(73) Assignee: NSK-Warner K.K., Tokyo (JP)

( * ) Notice: Subject to any disclaimer, the term of this patent is extended or adjusted under 35 U.S.C. 154(b) by 0 days.

(21) Appl. No.: 10/074,004

(22) Filed: Feb. 14, 2002

(65) Prior Publication Data

US 2002/0112933 A1 Aug. 22, 2002

(30) Foreign Application Priority Data

Feb. 16, 2001 (JP) ........................................ 2001-040423

(51) Int. Cl.⁷ ............................. F16D 41/07; F16C 33/10
(52) U.S. Cl. ............. 192/45.1; 192/110 B; 192/113.32; 384/292; 384/293
(58) Field of Search ........................... 192/45.1, 110 B, 192/113.32; 384/291, 292, 293

(56) References Cited

U.S. PATENT DOCUMENTS

| | | | | |
|---|---|---|---|---|
| 1,882,956 A | * | 10/1932 | Sandler ...................... | 384/293 |
| 3,705,753 A | * | 12/1972 | Bierlein et al. ............ | 384/288 |
| 5,129,739 A | * | 7/1992 | Asai et al. .................. | 384/292 |
| 5,601,175 A | * | 2/1997 | Kinoshita et al. ......... | 192/113.32 |
| 5,638,936 A | * | 6/1997 | Kinoshita et al. ......... | 192/113.32 |
| 5,671,836 A | * | 9/1997 | Shirataki et al. .......... | 192/113.32 |
| 6,082,904 A | * | 7/2000 | Ono et al. .................. | 384/291 |
| 6,095,690 A | * | 8/2000 | Niegel et al. .............. | 384/293 |
| 6,435,326 B2 | * | 8/2002 | Shirataki et al. .......... | 192/45.1 |
| 2002/0050432 A1 | * | 5/2002 | Ikeda ......................... | 192/45.1 |

FOREIGN PATENT DOCUMENTS

| JP | 8-68430 A | * | 3/1996 | ........... F16D/41/06 |
|---|---|---|---|---|
| JP | 8-135690 A | * | 5/1996 | ........... F16D/41/07 |

* cited by examiner

Primary Examiner—Richard M. Lorence
(74) Attorney, Agent, or Firm—Miles & Stockbridge P.C.

(57) ABSTRACT

An end bearing, a one-way clutch device and a method of manufacturing the end bearing, capable of preventing abrasion or scorching of the end bearing while improving the productivity. The annular end bearing which is interposed between an inner race and an outer race of the one-way clutch device and is in a slidable contact with the inner race or the outer race when it is operated, wherein a recess having the depth of 5 to 30 μm is formed on a slidable contact surface with inner race or the outer race. The method comprises a blanking step of blanking an annular blank from a metal plate, a recess forming step of forming a recess in a predetermined portion of said blank, and a drawing step of forming a flange on said blank by drawing, wherein the above recess forming step is executed before or after the blanking step, or at the same time with the blanking step.

6 Claims, 23 Drawing Sheets

END BEARING AND ONE-WAY CLUTCH DEVICE

This application claims the benefit of Japanese Patent application No. 2001-040423 which is hereby incorporated by reference.

BACKGROUND OF THE INVENTION

1. Field of the Invention

The present invention relates to a one-way clutch device for constituting an automatic transmission or the like for vehicles, an end bearing for constituting the one-way clutch device, and a method of manufacturing such an end bearing.

2. Related Background Art

An automatic transmission for vehicles is generally provided with a planetary gear transmission mechanism of three-speed to five-speed or around, in addition to a torque converter serving as a fluid coupling, and is adapted to change the speed by properly fixing or releasing the constituent elements (such as a sun gear or a planetary gear) of the planetary gear transmission mechanism by means of frictional engaging means such as a clutch or a brake. As such a frictional engaging means to be provided inside the automatic transmission, there is employed a multiple disc wet clutch which has friction plates and separator plates alternately disposed thereon, with the exception of band brakes of a specific type. For pressure contact (frictional engagement) between the both plates, pressure oil from a transmission control oil pressure circuit is employed. Also, some automatic transmissions employ, as such frictional engagement means, the one which incorporates therein a one-way clutch device to freely rotate a gear shaft, or the like, in one direction of rotation, thereby realizing easier transmission control.

In a one-way clutch device, normally an annular end bearing for regulating the movement of the clutch constituent elements, such as a sprag, is interposed between an inner race and an outer race, in order to secure an action of the constituent elements. In the one-way clutch device, either one of the inner race and the outer race is fixed and the other is rotated, so that the end bearing is brought into slidable contact with the inner race or the outer race. Then, in the one-way clutch device with, for instance, the fixed inner race, lubrication using centrifugal force can not be conducted for the one-way clutch mechanism, so that lubricating oil is supplied with pressure by a forcible lubricating means, such as a pressure pump, to an oil path formed on the inner race. The supplied lubricating oil flows out through a gap between the end bearing and the inner race after lubricating or cooling the sprag, or the like, through the oil path.

In a one-way clutch device of this type, the end bearing works to secure an action of the sprag, as described above. However, in a relative rotation between the inner race and the outer race (i.e., in an operation of the automatic transmission, or the like), the end bearing is always in slidable contact with the outer peripheral surface of the inner race, irrespective of an operational state of the one-way clutch mechanism. For this reason, if the lubricating oil is not supplied appropriately into the gap between the inner race and the end bearing, the slide surface may be worn away to an impermissible extent, or the frictional heat may be accumulated to scorch the slide surface.

Accordingly, as shown in FIG. 27, some of conventional one-way clutch devices employ such a structure that spiral oil grooves 71 are formed on the inner peripheral surface of an end bearing 21, thereby realizing smooth supply of lubricating oil. However, though lubrication can be satisfactorily conducted even with the end bearing 21 shown in FIG. 27, problems as described below may occur in this case. Specifically, since the contact facial pressure around the oil grooves 71 locally rises on the slide surface of the end bearing 21, it is inevitable that the end bearing 21 is abraded further in driving for a long time. The abrasion of the end bearing 21 becomes a factor for impeding a proper performance of a cage, and for mixing abrasion powder into transmission oil.

SUMMARY OF THE INVENTION

The present invention is contrived considering the above circumstances, and an object thereof is to provide a one-way clutch device and a method of manufacturing an end bearing, capable of preventing abrasion or scorching of the end bearing while improving the productivity.

In order to solve the above problems, according to the present invention, there is proposed an annular end bearing which is interposed between an inner race and an outer race of a one-way clutch device and is in a slidable contact with the inner race or the outer race when it is operated, wherein a recess having the depth of 5 to 30 $\mu$m is formed on a slidable contact surface with inner race or the outer race.

Also, in the end bearing of the present invention, said recess is preferably formed by a circumferential groove, a spiral groove, or a dimple, or a combination thereof.

Also, in the end bearing of the present invention, it is preferable that a flange is formed on at least one of the inner periphery and the outer periphery thereof by plastic working of a metal plate, and said recess is also formed by plastic working.

It is also preferable that the end bearing of the present invention is interposed between the inner race and the outer race.

According to the present invention, there is also provided a method of manufacturing an end bearing which is interposed between an inner race and an outer race of a one-way clutch device, which method comprises a blanking step of blanking an annular blank from a metal plate, a recess forming step of forming a recess in a predetermined portion of said blank, and a drawing step of forming a flange on said blank by drawing, wherein the above recess forming step is executed before or after the blanking step, or at the same time with the blanking step.

Also, according to the present invention, there is proposed a method of manufacturing an end bearing which is interposed between an inner race and an outer race of a one-way clutch device, which method comprises a blanking step of blanking an annular blank out of a metal plate material, a recess forming step of forming a recess in a predetermined portion of said blank, and a drawing step of forming a flange on said blank by drawing, wherein the above recess forming step is executed at the same time with the drawing step.

Also, in the method of manufacturing an end bearing of the present invention, it is preferable that the recess forming step is for forming said recess by plastic working.

DETAILED DESCRIPTION OF THE PREFERRED EMBODIMENTS

Detailed description will be made below on embodiments of a one-way clutch device and an end bearing and embodiments of a method of manufacturing the end bearing according to the present invention, with reference to the drawings.

Figure 1:
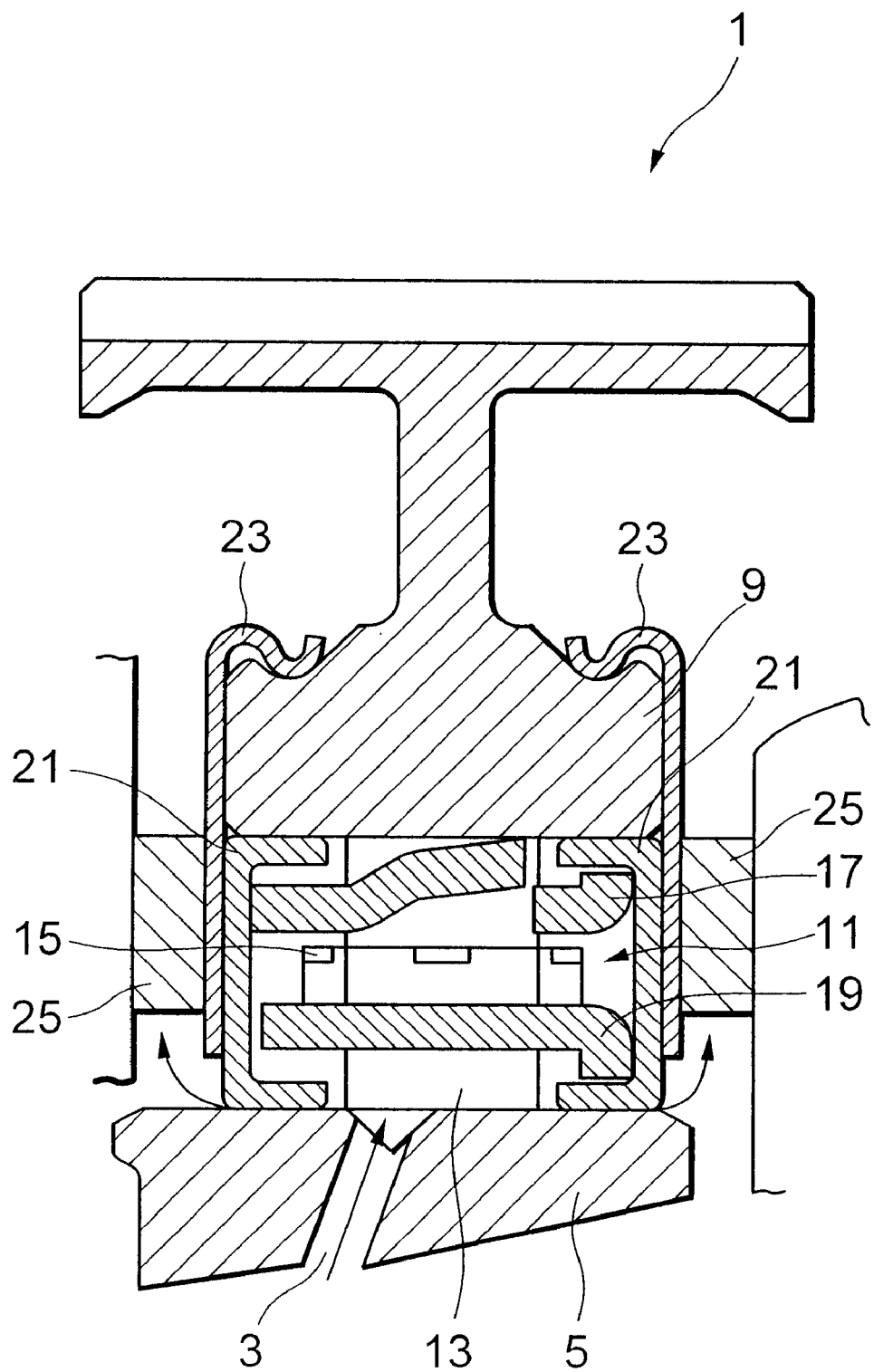
FIG. 1 is a longitudinal cross-sectional view for showing the essential portion of a one-way clutch device according to an embodiment of the present invention.

FIG. 1 is a longitudinal cross-sectional view for showing an embodiment of a one-way clutch device of the present invention. The one-way clutch device of the present embodiment is built in a multiple disc wet clutch of an automatic transmission which, however, has no relation to the gist of the present invention, so that description on the multiple disc wet clutch will be omitted.

The one-way clutch device 1 is comprised of an inner race 5 on which an oil path 3 is formed to open on the outer peripheral surface thereof, an outer race 9 which is supported coaxially and relatively rotatably with respect to this inner race 5, a one-way clutch mechanism 11 interposed between the inner race 5 and the outer race 9, and the like. The one-way clutch mechanism 11 is comprised of a large number of sprags 13 serving as torque transmission members, a ribbon spring 15 for retaining the sprags 13 and, at the same time, for biasing the sprags in the direction of engagement, an outer cage 17 for annularly holding the ribbon spring 15, an inner cage 19 for suppressing an excessive inclination of the sprags 13 together with the outer cage 17, a pair of annular end bearings 21 for maintaining the both cages 17 and 19 with a predetermined interval to secure an action of the sprags 13, and the like.

In this one-way clutch device 1, while the inner race 5 is fixed, the outer race 9 is rotated, whereby the one-way clutch mechanism 11 is rotated integrally with the outer race. In FIG. 1, reference numeral 23 denotes retainers which are mounted on the outer race 9 for limiting an axial movement of the end bearings 21, while reference numeral 25 denotes thrust washers each interposed between the retainer 23 and a member to be retained.

In this one-way clutch device 1, lubrication using centrifugal force can not be conducted since the inner race 5 is fixed, so that lubricating oil is supplied with pressure to an oil path 3 of the inner race 5 by means of a forcible lubrication means such as a pressure pump. As indicated by the arrow in FIG. 1, the lubricating oil supplied from the inner peripheral side of the inner race 5 flows into the inner peripheral side of the sprags 13 through the oil path 3, and then flows out through a gap between the end bearings 21 and the inner race 5. Then, since the sprags 13 and the end bearings 21 are rotated integrally with the outer race 9, slide surfaces between these members and the inner race 5 are lubricated by the supplied lubricating oil.

Figure 2:
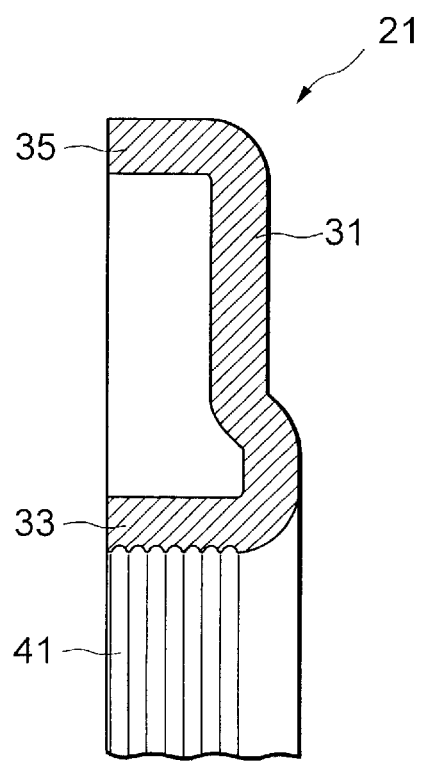
FIG. 2 is a longitudinal cross-sectional view for showing the essential portion of an end bearing according to the embodiment in an enlarged manner.

FIG. 2 is a longitudinal cross-sectional view for showing the essential portion of the end bearing 21 in an enlarged manner. As shown in FIG. 2, the end bearing 21 is plastically formed of a phosphor bronze plate to have a cross section substantially in a U shape, in which an inner flange 33 and an outer flange 35 are extended on the inner and outer peripheries of an annular web 31. On the inner peripheral surface of the inner flange 33, there are formed a large number of small circumferential grooves 41 having the depth of 5 to 30 $\mu$m, as recesses. Note that though, for simplifying the description, the circumferential grooves 41 are shown in an exaggerated (enlarged) manner in FIG. 2, the actual depth and the width of the grooves are extremely small and the actual number of the grooves are far more than that shown in the figure.

In the one-way clutch device 1 of the present embodiment, since a large number of the small circumferential grooves 41 are provided on the inner peripheral surface of the inner flange 33 of the end bearing 21, the lubricating oil supplied through the oil path 3 of the inner race 5 advances into these circumferential grooves 41 and is retained therein, so that lubrication between the inner race 5 and the end bearing 21 is conducted with most satisfaction. Moreover, the contact facial pressure does nor rise locally between the inner race 5 and the end bearing 21, so that the end bearing 21 is hardly abraded even with a long-term driving. As a result, there arises no such inconveniences as that the sprags 13 are prevented from properly being held by the both cages 17 and 19, or abrasion powder from the end bearings 21 is mixed into the transmission oil.

FIGS. 3 through 10 show examples of a recess to be formed on the inner flange 33 of the end bearing 21. The depth of all these recesses is in a range from 5 to 30 $\mu$m, and the action and the effect thereof are the same as those of the circumferential grooves 41 described above.

Figure 3:
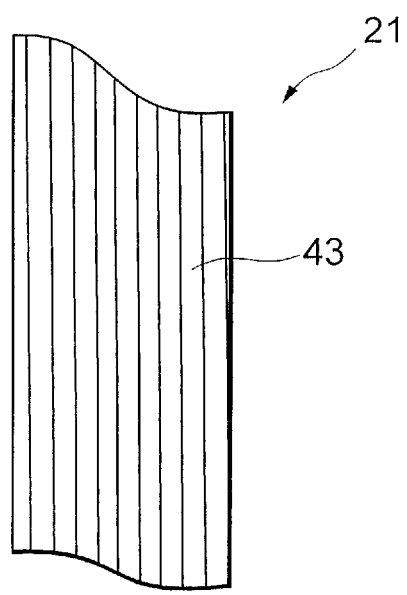
FIG. 3 is a view for showing a recess formed on an inner flange of the end bearing.
Figure 4:
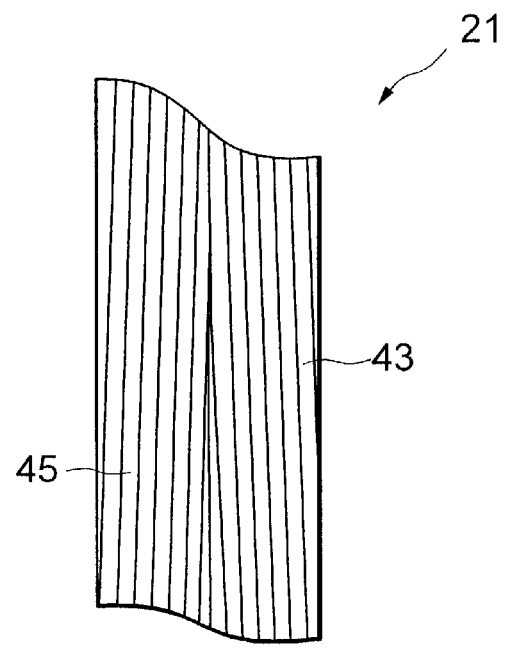
FIG. 4 is a view for showing a recess formed on the inner flange of the end bearing.

FIG. 3 shows a recess having a large number of spiral grooves 43, in the same enlarged manner as that for the circumferential grooves 41 described above. A recess shown in FIG. 4 has a combination of two spiral grooves 43 and 45 with different directions of inclination.

Figure 5:
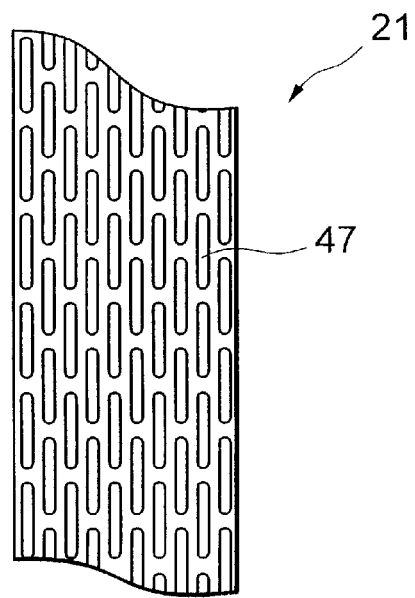
FIG. 5 is a view for showing a recess formed on the inner flange of the end bearing.
Figure 6:
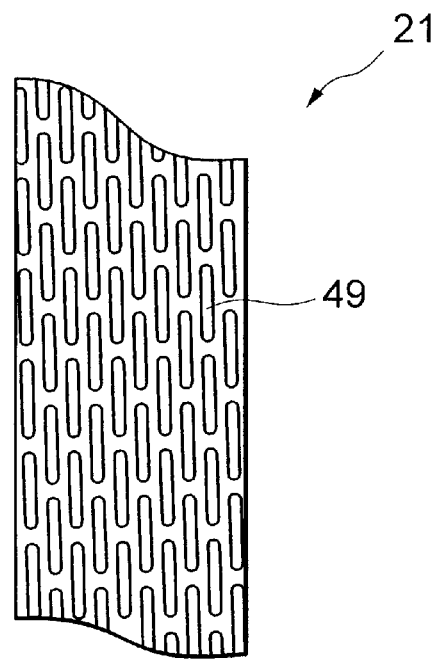
FIG. 6 is a view for showing a recess formed on the inner flange of the end bearing.
Figure 7:
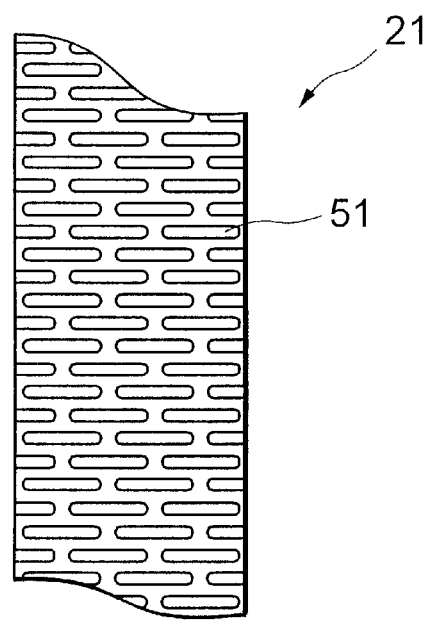
FIG. 7 is a view for showing a recess formed on the inner flange of the end bearing.

FIG. 5 shows a recess having a large number of dimples 47 extending in the circumferential direction, while FIG. 6 shows a recess having a large number of dimples 49 extending in a spiral direction. FIG. 7 shows a recess having a large number of dimples 51 extending in the axial direction.

Figure 8:
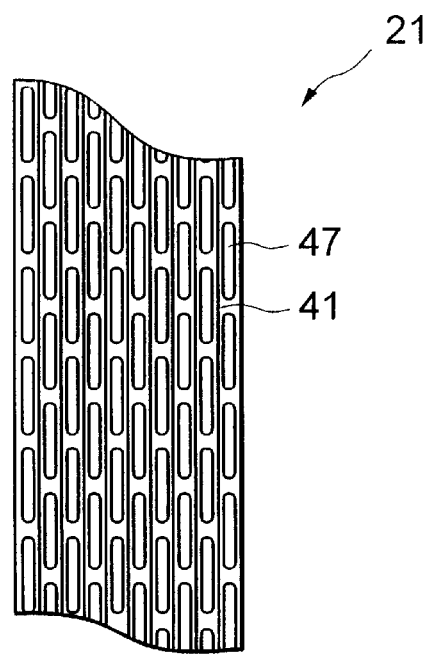
FIG. 8 is a view for showing a recess formed on the inner flange of the end bearing.
Figure 9:
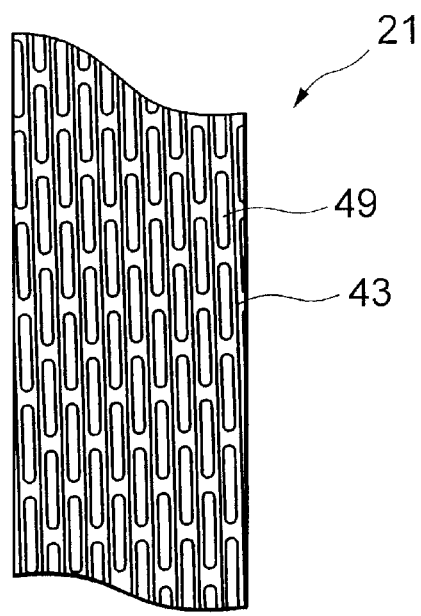
FIG. 9 is a view for showing a recess formed on the inner flange of the end bearing.
Figure 10:
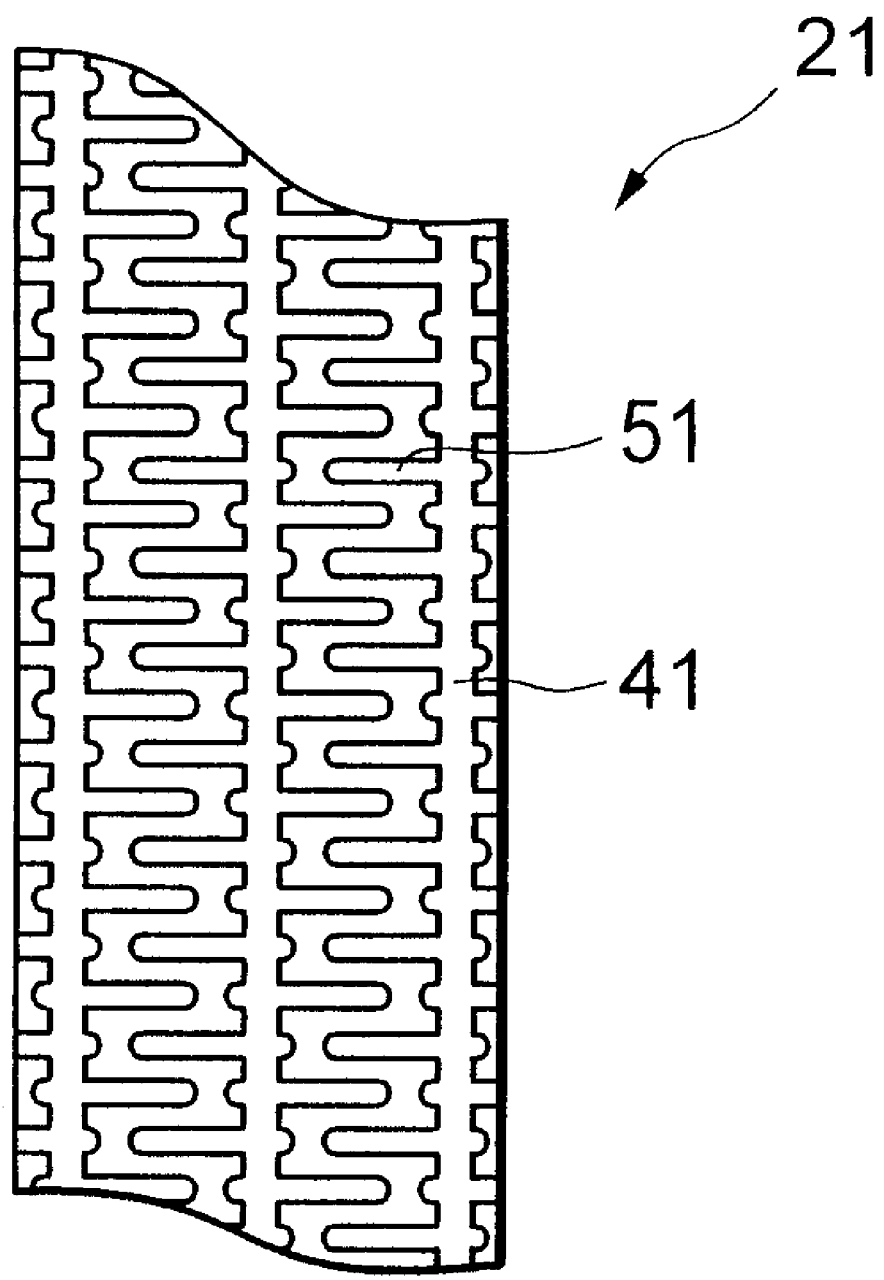
FIG. 10 is a view for showing a recess formed on the inner flange of the end bearing.

FIG. 8 shows a recess having circumferential grooves 41 and dimples 47 which are disposed alternately therein, while FIG. 9 shows a recess having spiral grooves 43 and dimples 49 which are disposed alternately therein. FIG. 10 shows a recess which has circumferential grooves 41 and dimples 51 extending in the axial direction connected to each other.

A method of manufacturing the end bearing will be described below.

Figure 11A:
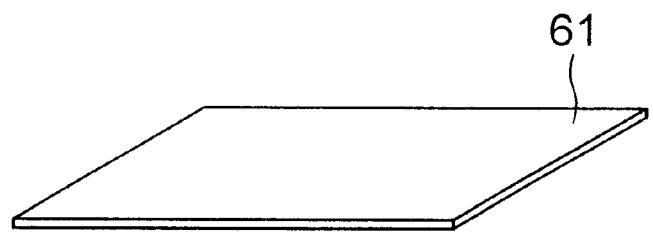
FIGS. 11A to 11D represent views for explaining a first embodiment of a method of manufacturing the end bearing.
Figure 11B:
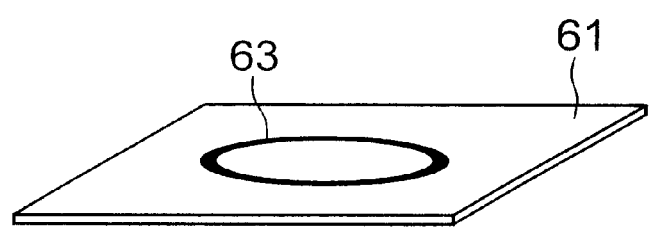
Figure 11C:
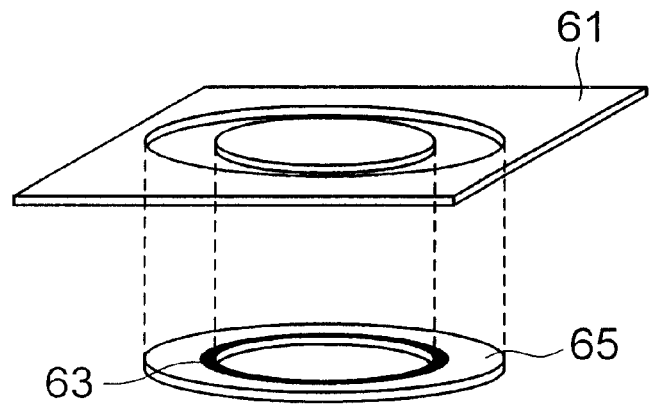
Figure 11D:
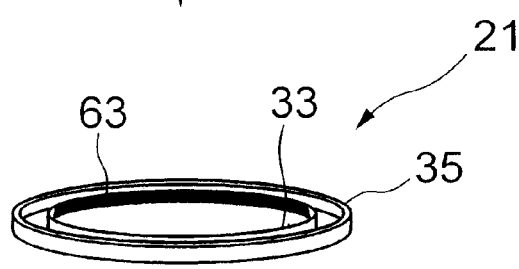

FIGS. 11A to 11D represent views for explaining a first embodiment of the method of manufacturing the end bearing, in which the manufacturing processing is conducted in the order from FIGS. 11A to 11D. In the present embodiment, a recess 63 is annularly formed in the step of FIG. 11B by pressing a material (phosphor bronze plate) 61 shown in FIG. 11A. In the step of FIG. 11C, an annular blank 65 including the recess 63 is blanked, so as to form an end bearing 21 having an inner flange 33 and an outer flange 35 with a drawing die in the step of FIG. 11D. Note that on the formed end bearing 21, a recess 63 is naturally positioned on the inner peripheral surface of the inner flange 33.

Figure 12A:
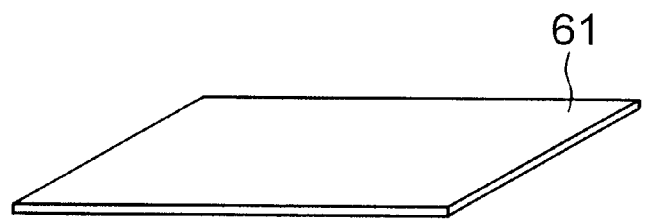
FIGS. 12A to 12C represent views for explaining a second embodiment of the method of manufacturing the end bearing.
Figure 12B:
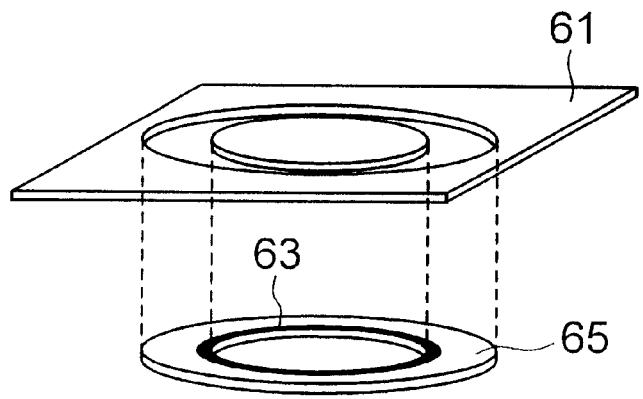
Figure 12C:
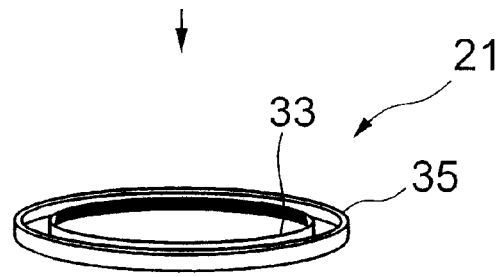
Figure 13A:
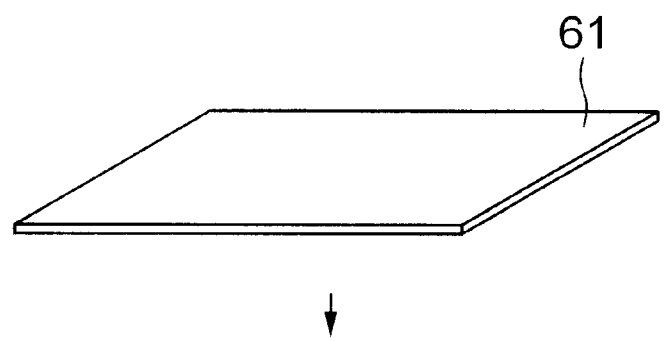
FIGS. 13A to 13D represent views for explaining a third embodiment of the method of manufacturing the end bearing.
Figure 13B:
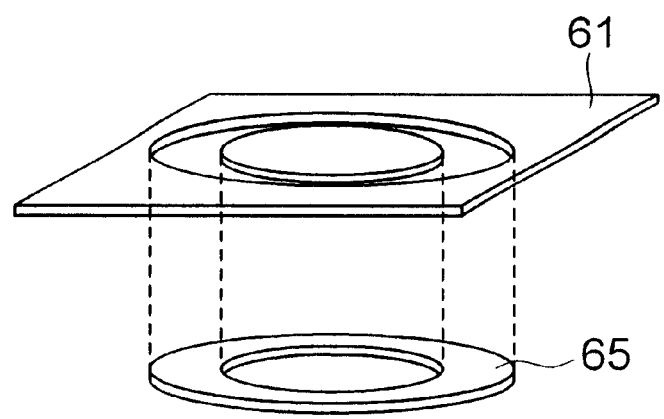
Figure 13C:
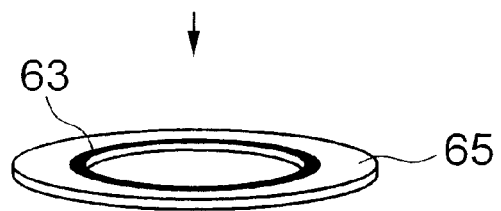
Figure 13D:
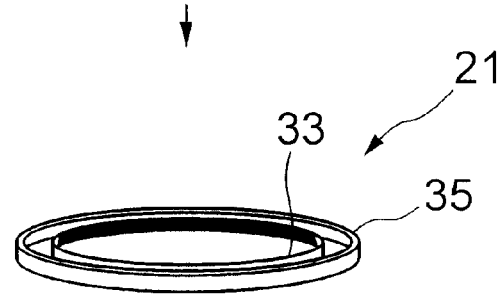
Figure 14A:
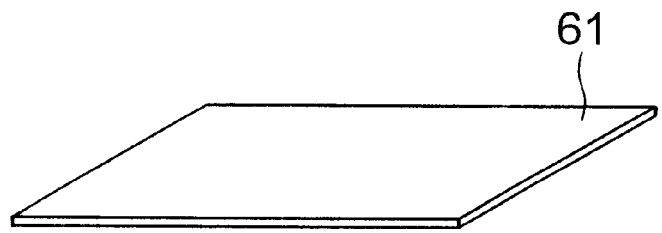
FIGS. 14A to 14E represent views for explaining a fourth embodiment of the method of manufacturing the end bearing.
Figure 14B:
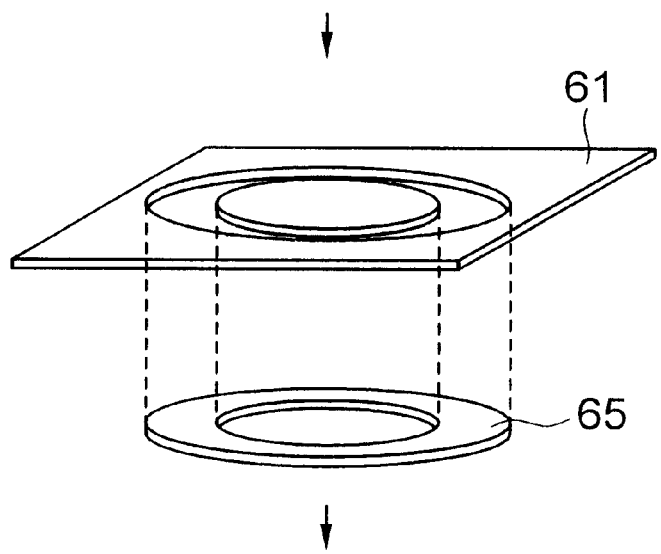
Figure 14C:
Figure 14D:
Figure 14E:
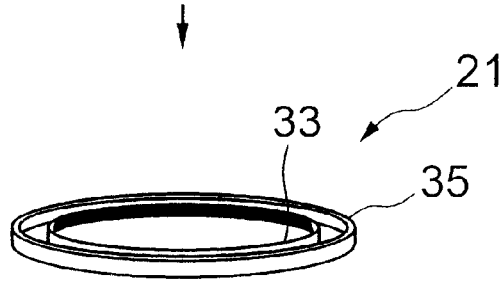

FIGS. 12A to 12C represent views for explaining a second embodiment of the method of manufacturing the end bearing, in which the manufacturing processing is conducted in the order from FIGS. 12A to 12C. In the present embodiment, a recess 63 is annularly formed by pressing a material 61 shown in FIG. 12A and, at the same time, by blanking an annular blank 65 with die cutting in the step of FIG. 12B, so as to form the end bearing 21 having the inner flange 33 and the outer flange 35 by means of a drawing die in the step of FIG. 12C.

FIGS. 13A to 13D represent views for explaining a third embodiment of the method of manufacturing the end bearing, in which the manufacturing processing is conducted in the order from FIGS. 13A to 13D. In the present embodiment, an annular blank 65 is blanked in the step of FIG. 13B from a material 61 shown in FIG. 13A, a recess 63 is formed annularly by pressing work in the step of FIG. 13C, and then the end bearing 21 having the inner flange 33 and the outer flange 35 is formed with a drawing die in the step of FIG. 13D.

FIGS. 14A to 14E represent views for explaining a fourth embodiment of the method of manufacturing the end bearing, in which the manufacturing processing is conducted in the order from FIGS. 14A to 14E. In the present embodiment, an annular blank 65 is formed by pressing work in the step of FIG. 14B from a material 61 shown in FIG. 14A. Then, in the steps of FIGS. 14C and 14D, the end bearing 21 having the inner flange 33 and the outer flange 35 is formed while forming a recess 63 annularly with a drawing die.

Figure 15A:
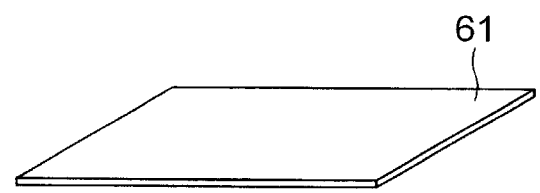
FIGS. 15A to 15F represent views for explaining a fifth embodiment of the method of manufacturing the end bearing.
Figure 15B:
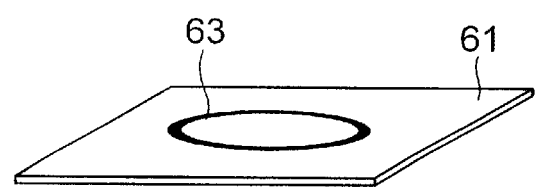
Figure 15C:
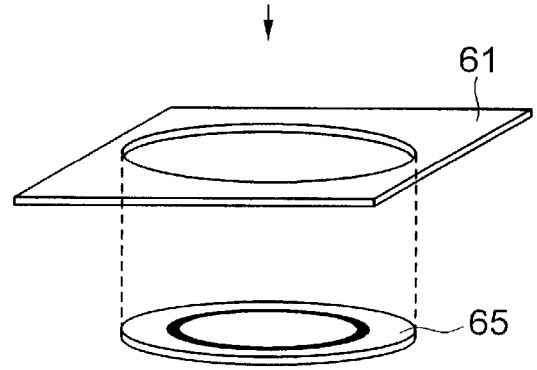
Figure 15D:
Figure 15E:
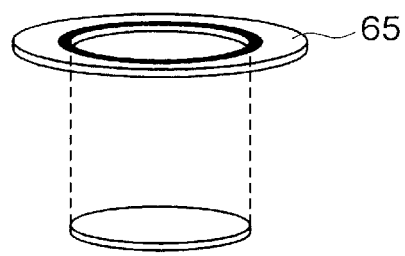
Figure 15F:
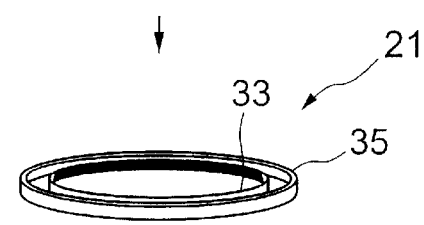
Figure 16A:
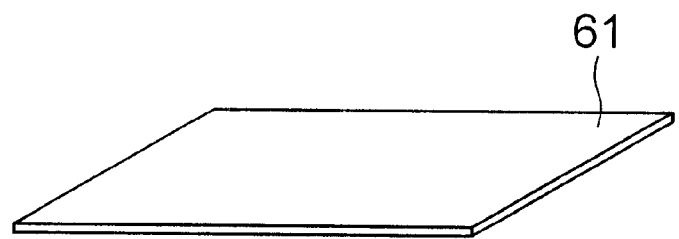
FIGS. 16A to 16D represent views for explaining a sixth embodiment of the method of manufacturing the end bearing.
Figure 16B:
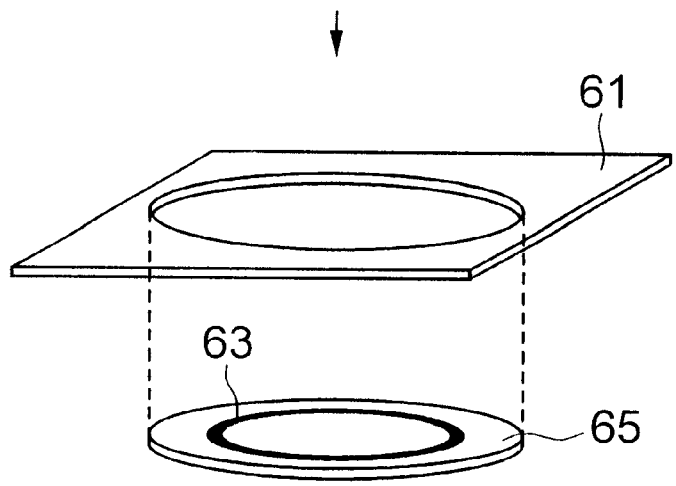
Figure 16C:
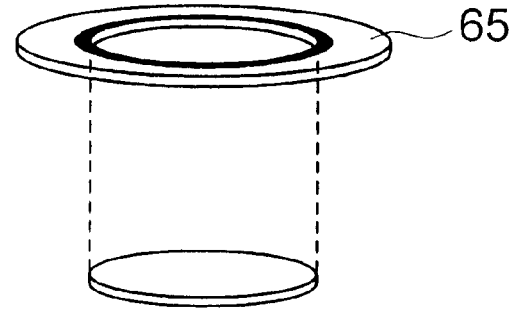
Figure 16D:
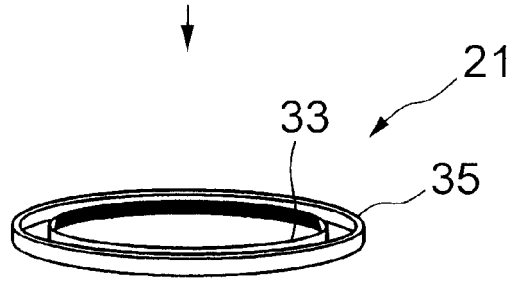
Figure 17A:
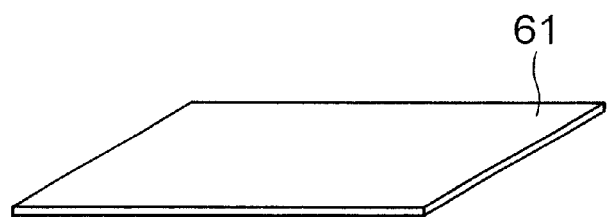
FIGS. 17A to 17E represent views for explaining a seventh embodiment of the method of manufacturing the end bearing.
Figure 17B:
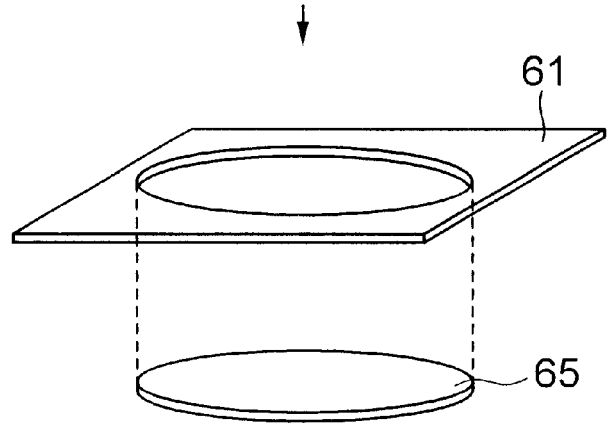
Figure 17C:
Figure 17D:
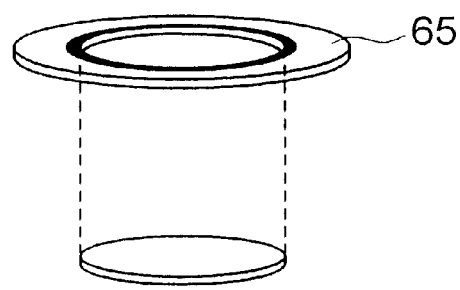
Figure 17E:
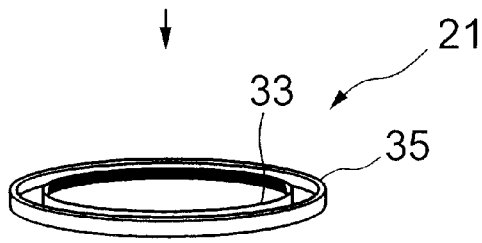
Figure 18A:
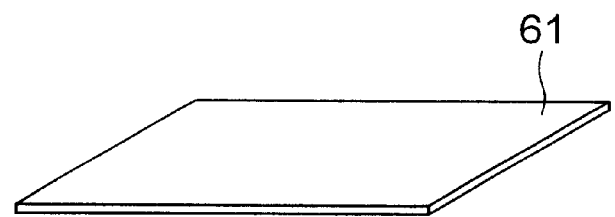
FIGS. 18A to 18E represent views for explaining an eighth embodiment of the method of manufacturing the end bearing.
Figure 18B:
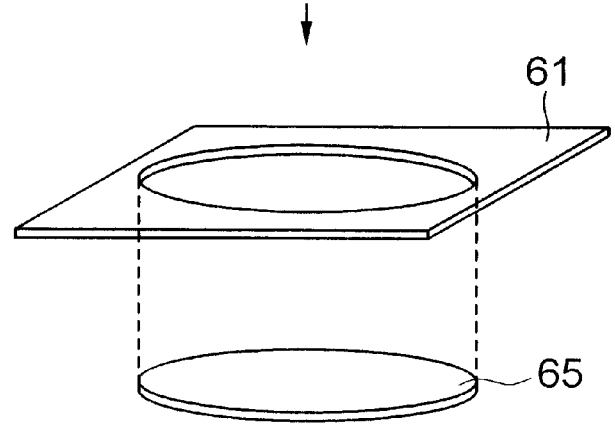
Figure 18C:
Figure 18D:
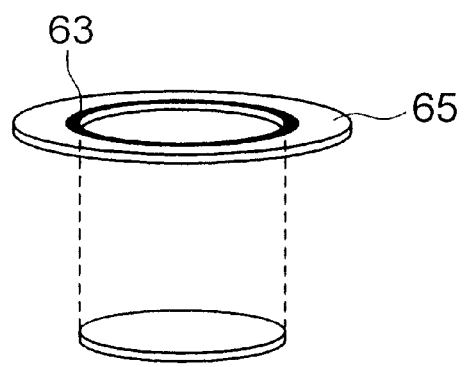
Figure 18E:
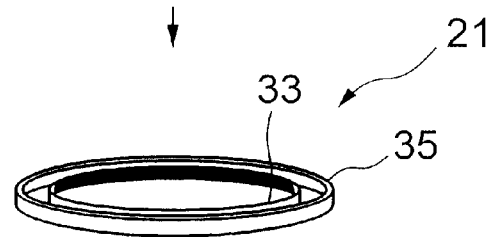
Figure 19A:
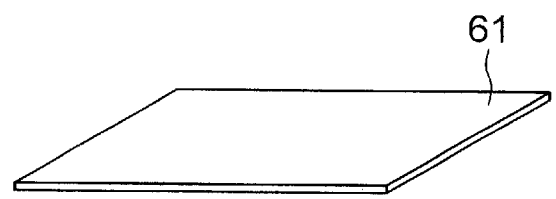
FIGS. 19A to 19F represent views for explaining a ninth embodiment of the method of manufacturing the end bearing.
Figure 19B:
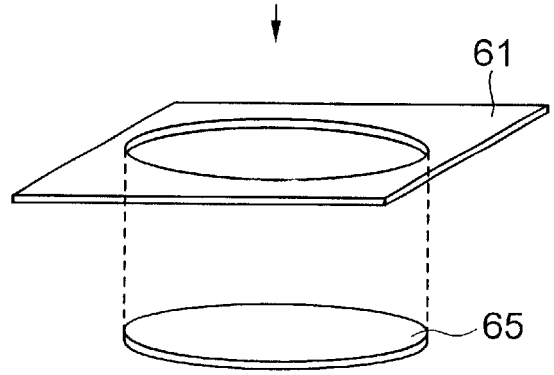
Figure 19C:
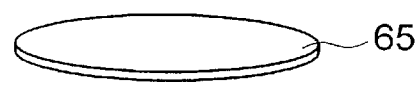
Figure 19D:
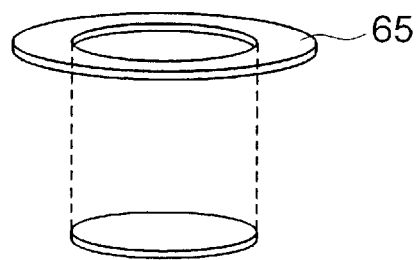
Figure 19E:
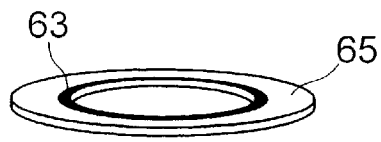
Figure 19F:
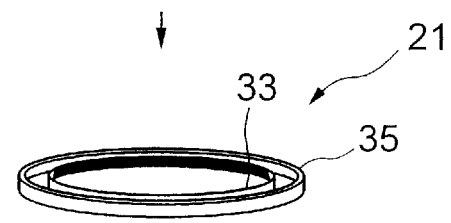
Figure 20A:
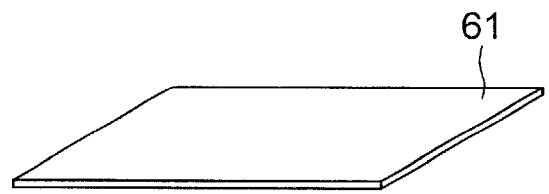
FIGS. 20A to 20F represent views for explaining a tenth embodiment of the method of manufacturing the end bearing.
Figure 20B:
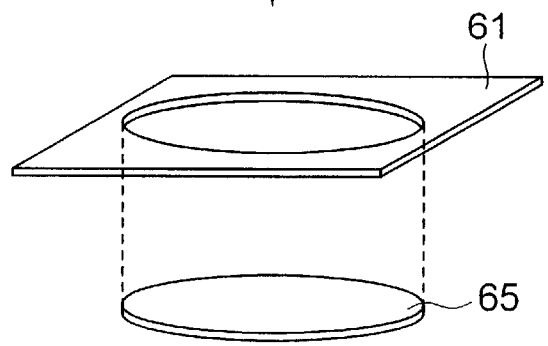
Figure 20C:
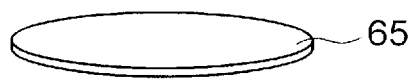
Figure 20D:
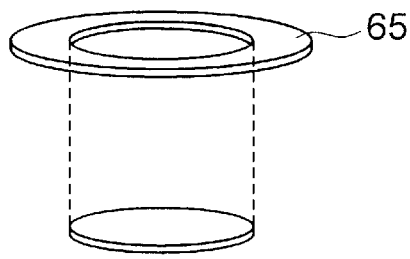
Figure 20E:
Figure 20F:
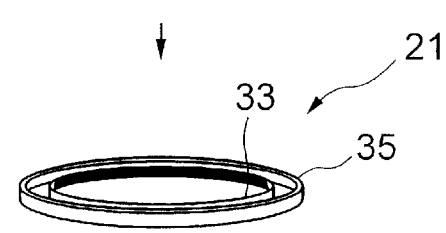
Figure 21A:
FIGS. 21A to 21F represent views for explaining an eleventh embodiment of the method of manufacturing the end bearing.
Figure 21B:
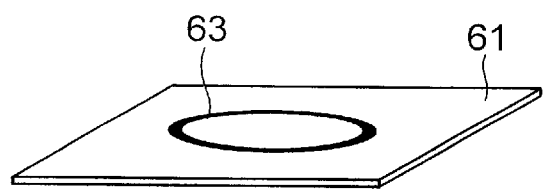
Figure 21C:
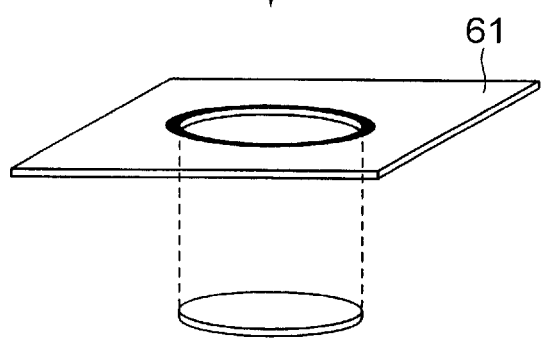
Figure 21D:
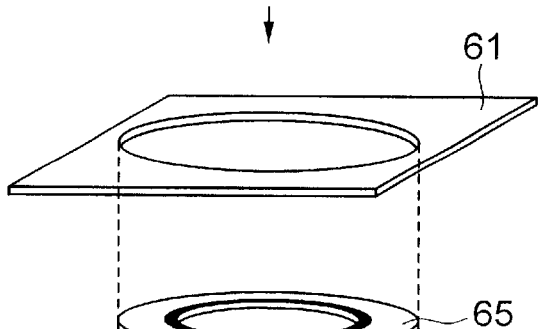
Figure 21E:
Figure 21F:
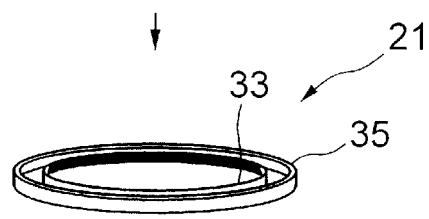

FIGS. 15A to 15F represent views for explaining a fifth embodiment of the method of manufacturing the end bearing, in which the manufacturing processing is conducted in the order from FIGS. 15A to 15F. In the present embodiment, a recess 63 is annularly formed by pressing work in the step of FIG. 15B from a material 61 shown in FIG. 15A. Then, in the steps of FIGS. 15C and 15D, a disc-shaped blank 65 including the recess 63 is formed by blanking work. In the step of FIG. 15E, the central portion of the blank 65 is blanked, so as to form the end bearing 21 having the inner flange 33 and the outer flange 35 with a drawing die in the step of FIG. 15F.

FIGS. 16A to 16D represent views for explaining a sixth embodiment of the method of manufacturing the end bearing, in which the manufacturing processing is conducted in the order from FIGS. 16A to 16D. In the present embodiment, a recess 63 is annularly formed by pressing work from a material 61 shown in FIG. 16A and, at the same time, a disc-shaped blank 65 is blanked in the step of FIG. 16B, and the central portion of the blank 65 is blanked in the step of FIG. 16D, so as to form, in the step of FIG. 16D, the end bearing 21 having the inner flange 33 and the outer flange 35 with a drawing die.

FIGS. 17A to 17E represent views for explaining a seventh embodiment of the method of manufacturing the end bearing, in which the manufacturing processing is conducted in the order from FIGS. 17A to 17E. In the present embodiment, a disc-shaped blank 65 is formed by blanking work in the step of FIG. 17B from a material 61 shown in FIG. 17A, a recess 63 is formed annularly by pressing working in the step of FIG. 17C, and the central portion of the blank 65 is blanked in the step of FIG. 17D, so as to form, in the step of FIG. 17E, the end bearing 21 having the inner flange 33 and the outer flange 35 with a drawing die.

FIGS. 18A to 18E represent views for explaining an eighth embodiment of the method of manufacturing the end bearing, in which the manufacturing processing is conducted in the order from FIGS. 18A to 18E. In the present embodiment, a disc-shaped blank 65 is formed by blanking work in the steps of FIGS. 18B and 18C from a material 61 shown in FIG. 18A, a recess 63 is annularly formed by pressing work and, at the same time, the central portion of the blank 65 is blanked in the step of FIG. 18D, so as to form, in the step of FIG. 18E, the end bearing 21 having the inner flange 33 and the outer flange 35 with a drawing die.

FIGS. 19A to 19F represent views for explaining a ninth embodiment of the method of manufacturing the end bearing, in which the manufacturing processing is conducted in the order from FIGS. 19A to 19F. In the present embodiment, a disc-shaped blank 65 is formed by blanking work in the steps of FIGS. 19B and 19C, from a material 61 shown in FIG. 19A, the central portion of the blank 65 is blanked in the step of FIG. 19D, and a recess 63 is formed annularly by pressing work in the step of FIG. 19E, so as to form, in the step of FIG. 19F, the end bearing 21 having the inner flange 33 and the outer flange 35 with a drawing die.

FIGS. 20A to 20F represent views for explaining a tenth embodiment of the method of manufacturing the end bearing, in which the manufacturing processing is conducted in the order from FIGS. 20A to 20F. In the present embodiment, a disc-shaped blank 65 is obtained by blanking a material 61 shown in FIG. 20A in the steps of FIGS. 20B and 20C and, in the step of FIG. 20D, the central portion of the blank 65 is blanked in the step of FIG. 20D, so as to form the end bearing 21 having the inner flange 33 and the outer flange 35 with a drawing die while forming the recess 63 annularly, in the step of FIGS. 20E and 20F.

FIGS. 21A to 21F represent views for explaining an eleventh embodiment of the method of manufacturing the end bearing, in which the manufacturing processing is conducted in the order from FIGS. 21A to 21F. In the present embodiment, a recess 63 is annularly formed by pressing work in the step of FIG. 21B from a material 61 shown in FIG. 21A, an inner part of the recess 63 is blanked in the step of FIG. 21C, and the blank 65 is blanked from the material 61 in the step of FIGS. 21D and 21E, so as to form the end bearing 21 having the inner flange 33 and the outer flange 35 with a drawing die in the step of FIG. 21F.

Figure 22A:
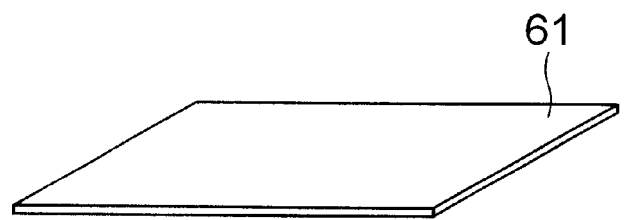
FIGS. 22A to 22E represent views for explaining a twelfth embodiment of the method of manufacturing the end bearing.
Figure 22B:
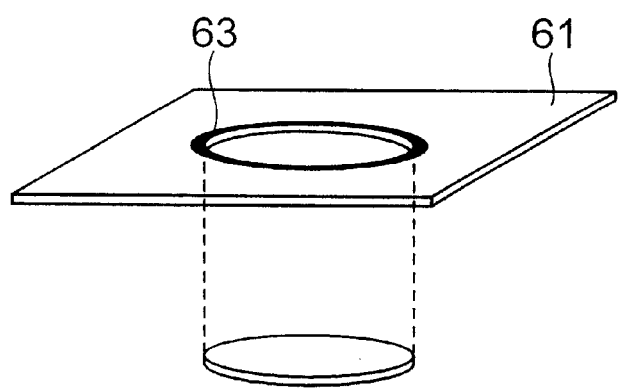
Figure 22C:
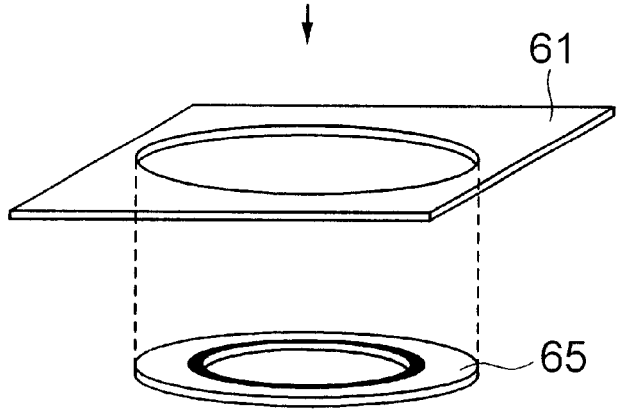
Figure 22D:
Figure 22E:
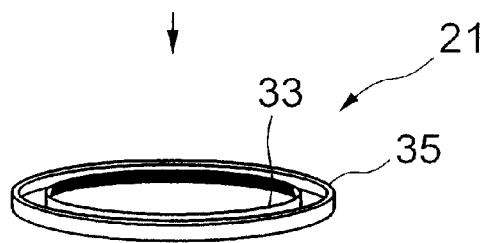

FIGS. 22A to 22E represent views for explaining a twelfth embodiment of the method of manufacturing the end bearing, in which the manufacturing processing is conducted in the order from FIGS. 22A to 22E. In the present embodiment, while a an inner part of a material 61 shown in FIG. 22A is blanked so as to annularly form a recess 63 by pressing work, the blank 65 is blanked from the material 61 at the same time in the step of FIGS. 22C and 22D, so that the end bearing 21 having the inner flange 33 and the outer flange 35 is formed with a drawing die in the step of FIG. 22E.

Figure 23A:
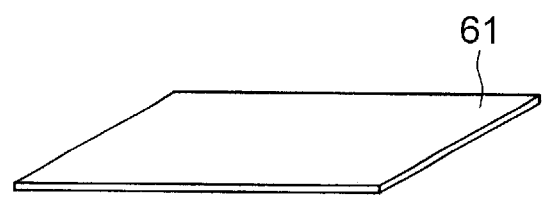
FIGS. 23A to 23F represent views for explaining a thirteenth embodiment of the method of manufacturing the end bearing.
Figure 23B:
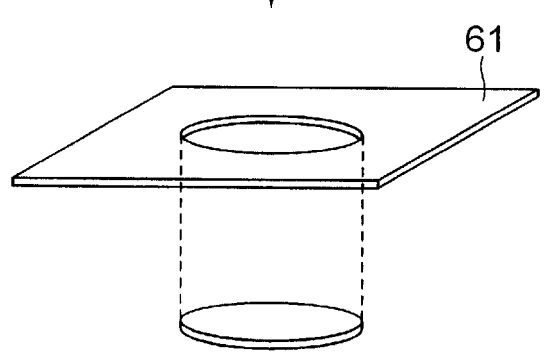
Figure 23C:
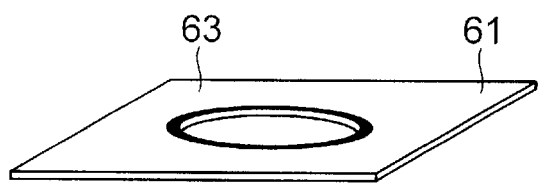
Figure 23D:
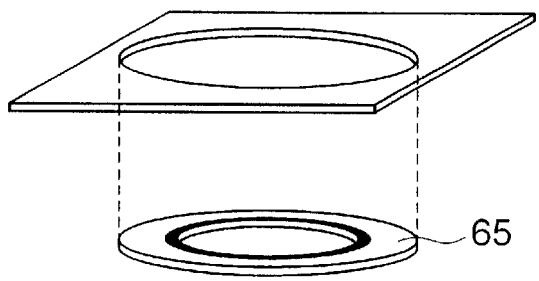
Figure 23E:
Figure 23F:
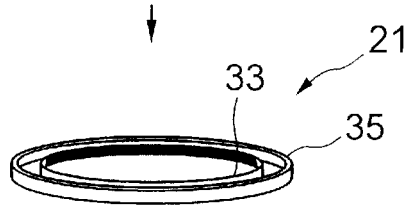
Figure 24A:
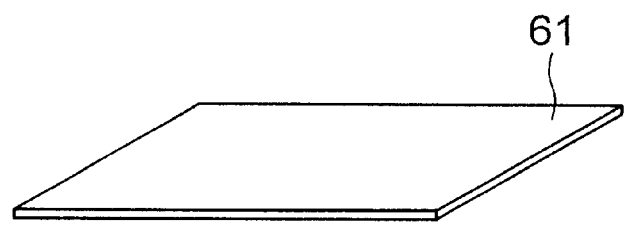
FIGS. 24A to 24E represent views for explaining a fourteenth embodiment of the method of manufacturing the end bearing.
Figure 24B:
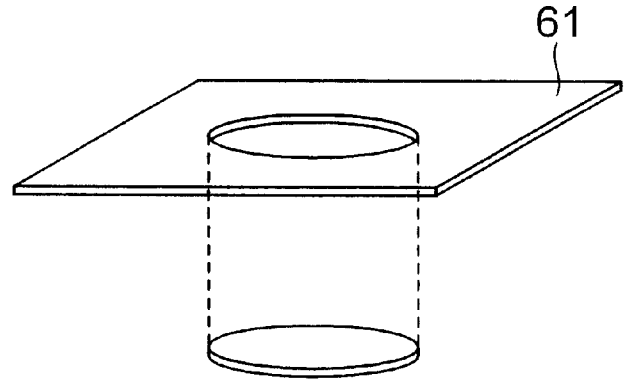
Figure 24C:
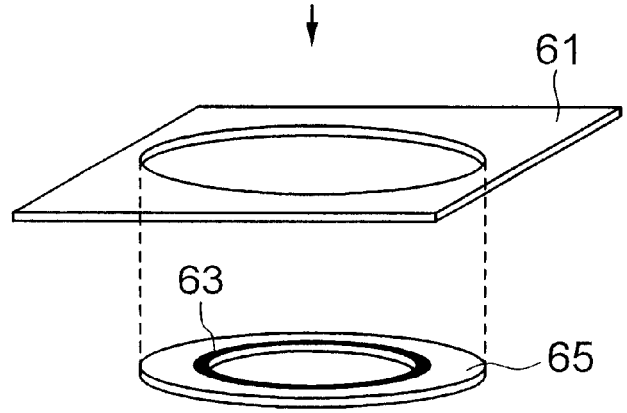
Figure 24D:
Figure 24E:
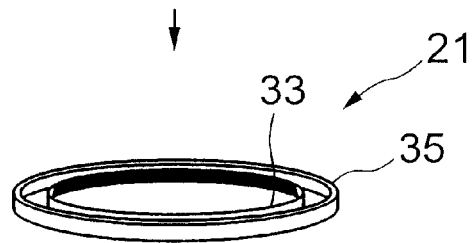

FIGS. 23A to 23F represent views for explaining a thirteenth embodiment of the method of manufacturing the end bearing, in which the manufacturing processing is conducted in the order from FIGS. 23A to 23F. In the present embodiment, an inner part of a material 61 shown in FIG. 23A is blanked in the step of FIG. 23B, a recess 63 is formed annularly by pressing work in the step of FIG. 23C, and a blank 65 is blanked in the steps of FIGS. 23D and 23E, so as to form the end bearing 21 having the inner flange 33 and the outer flange 35 with a drawing die in the step of FIG. 23F FIGS. 24A to 24E represent views for explaining a fourteenth embodiment of the method of manufacturing the end bearing, in which the manufacturing processing is conducted in the order from FIGS. 24A to 24E. In the present embodiment, an inner part of a material 61 shown in FIG. 24A is blanked in the step of FIG. 24B, and while a recess 63 is formed annularly by pressing work and a blank 65 is formed by blanking work in the steps of FIGS. 24C and 24D, the blank 65 is obtained by blanking work at the same time, so as to form the end bearing 21 having the inner flange 33 and the outer flange 35 with a drawing die in the step of FIG. 24E.

Figure 25A:
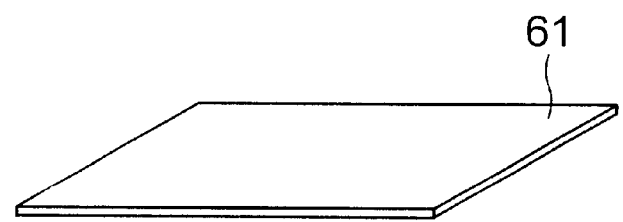
FIGS. 25A to 25E represent views for explaining a fifteenth embodiment of the method of manufacturing the end bearing.
Figure 25B:
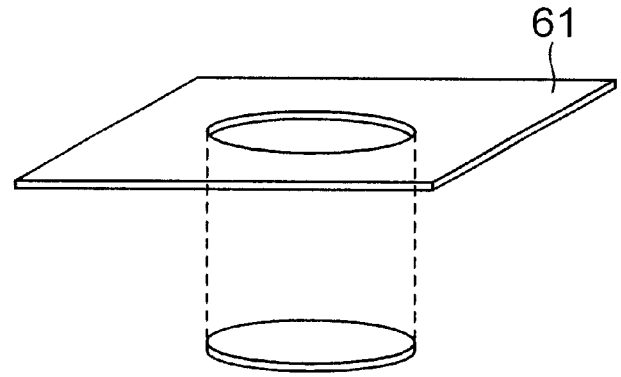
Figure 25C:
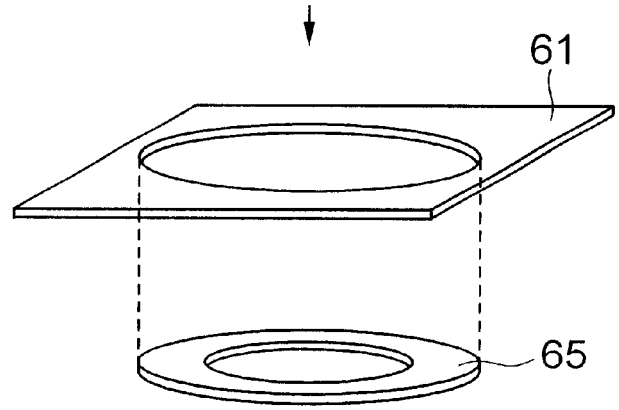
Figure 25D:
Figure 25E:
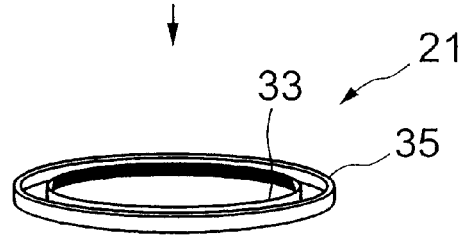

FIGS. 25A to 25E represent views for explaining a fifteenth embodiment of the method of manufacturing the end bearing, in which the manufacturing processing is conducted in the order from FIGS. 25A to 25E. In the present embodiment, an inner part of a material 61 shown in FIG. 25A is blanked in the step of FIG. 25B, a blank 65 is blanked in the steps of FIG. 25C and a recess 63 is annularly formed by pressing work in the step of FIG. 25D, so as to form the end bearing 21 having the inner flange 33 and the outer flange 35 with a drawing die in the step of FIG. 25E.

Figure 26A:
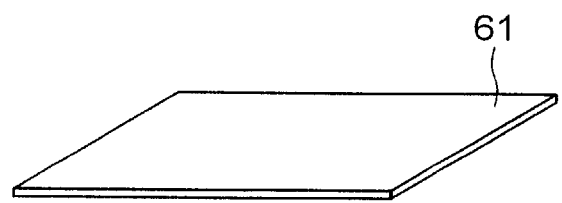
FIGS. 26A to 26F represent views for explaining a sixteenth embodiment of the method of manufacturing the end bearing.
Figure 26B:
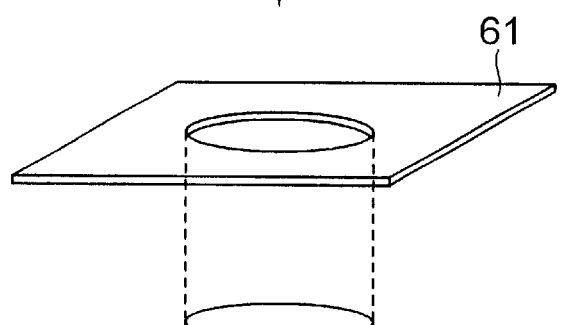
Figure 26C:
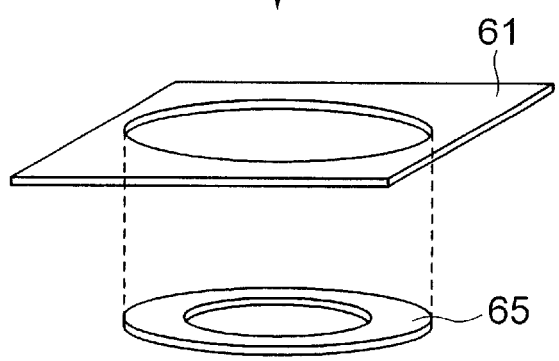
Figure 26D:
Figure 26E:
Figure 26F:
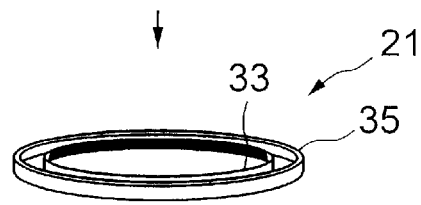
Figure 27:
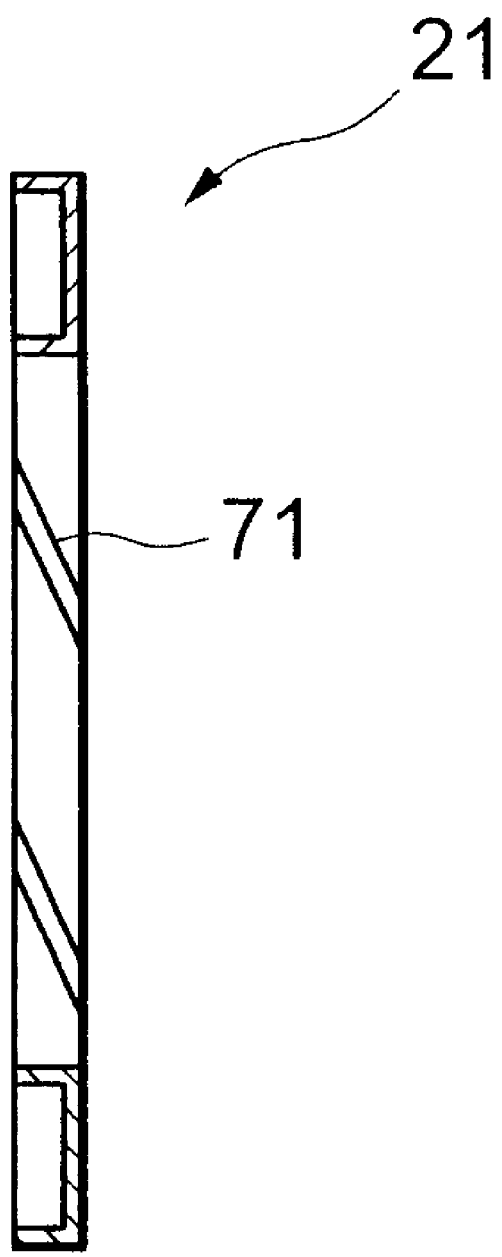
FIG. 27 is a longitudinal cross-sectional view for showing a conventional end bearing.

FIGS. 26A to 26F represent views for explaining a sixteenth embodiment of the method of manufacturing the end bearing, in which the manufacturing processing is conducted in the order from FIGS. 26A to 26F. In the present embodiment, an inner part of a material 61 shown in FIG. 26A is blanked in the step of FIG. 26B, and a blank 65 is blanked in the steps of FIGS. 26C and 26D, so as to form the end bearing 21 having the inner flange 33 and the outer flange 35 while forming a recess 63 annularly with a drawing die in the steps of FIGS. 26E and 26F.

Though specific embodiments of the invention are as described above, the present invention is not limited to these. For example, the present invention may be applied to an end bearing of a one-way clutch device of a type other than a sprag type. Besides, in an end bearing in slidable contact with an outer race, a recess may be formed on the outer peripheral surface thereof. The end bearing and the recess are not always required to be formed by plastic pressing, but may be formed by cutting work. A sole material for the end bearing may include copper alloy other than phosphor bronze, soft steel, stainless steel, or the like. As a bimetal material for the end bearing, a material such as lead bronze, high lead bronze, copper lead, Babbit's metal, cadmium alloy, plated silver, or the like, may be employed on the bearing side, while copper, cast iron, bronze, or the like, may be employed on the rear metal side. In addition, soft steel coated with any of kind of copper alloy or lead may be employed. The shapes or layout of the recesses arranged on the end bearing are not limited to those shown in the drawings. It is possible to coat or bury the recesses prepared in advance. In this case, when the coating agent is constricted or peeled off, the recesses are gradually exposed. Other specific arrangements of the one-way clutch device such as the shape of the web, or the like, of the end bearing can be properly changed within the scope of the spirit of the present invention.

According to the end bearing of the present invention, it is possible to prevent local abrasion or scorching of the end bearing, and according to the method of manufacturing the end bearing of the present invention, it is possible to manufacture the end bearing with efficiency.

What is claimed is:

1. An annular end bearing interposed between an inner race and an outer race of a one-way clutch device and to be brought into slidable contact with said inner race or said outer race when it is operated, said annular end bearing comprising:
   an inner flange formed in a substantially cylindrical shape and having an inner peripheral surface,
   an outer flange formed in a substantially cylindrical shape and having an outer peripheral surface;
   an annular web portion extending substantially radially to connect to the inner flange and outer flange,
   said inner peripheral surface of said inner flange having recesses extending substantially continuously around said peripheral surface and extending across substantially an entire width of said inner peripheral surface, said recesses having a depth of from about 5 to about 30 $\mu$m.

2. An end bearing according to claim 1, wherein said recesses are in a form selected from circumferential grooves, a spiral groove, dimples, and a combination thereof.

3. An end bearing according to claim 2, wherein said inner flange and said outer flange are formed by plastic working of a metal plate, and said recesses are also formed by plastic working.

4. An end bearing according to claim 2, wherein said inner flange and said outer flange are formed by plastic working of a metal plate, and said recesses are also formed by plastic working.

5. A one-way clutch having an inner race, an outer race concentrically arranged in relation to the inner race with an annular space defined therebetween, a clutch mechanism disposed in the annular space, and an end bearing disposed adjacent an end of the clutch mechanism and operative to guide the clutch mechanism, the inner race and the outer race being rotatable relative to each other, the end bearing being provided integrally with an inner flange formed cylindrically to have an inner peripheral surface, an outer flange formed cylindrically to have an outer peripheral surface, and an annular web portion extending substantially radially to connect the inner flange and the outer flange to form a substantially U-shaped cross-section, the outer peripheral surface of said outer flange of said end bearing being fixed to the inner peripheral surface of said outer race, the inner peripheral surface of said inner flange of said end bearing being in sliding contact with the outer peripheral surface of said inner race, and wherein said inner peripheral surface of the inner flange of said end bearing has minute recesses having a depth of 5 to 30 μm extending over substantially the entire surface, such that a lubricant oil supplied from a side of said inner race may enter into a region between the inner peripheral surface of the inner flange of said end bearing and the outer peripheral surface of the inner race and be held in the recesses to provide lubrication.

6. An annular end bearing interposed between an inner race and an outer race of a one-way clutch device and to be brought into slidable contact with said inner race or said outer race when said clutch device is operated, wherein recesses having a depth of from about 5 to about 30 μm are provided extending substantially continuously around a slidable contact surface of said annular end bearing, said slidable contact surface being adapted to be in slidable contact with either said inner race or said outer race.

* * * * *

UNITED STATES PATENT AND TRADEMARK OFFICE
CERTIFICATE OF CORRECTION

PATENT NO. : 6,755,292 B2
DATED : June 29, 2004
INVENTOR(S) : Yamamoto et al.

It is certified that error appears in the above-identified patent and that said Letters Patent is hereby corrected as shown below:

Column 9,
Line 1, change "claim 2," to -- claim 1, --.

Signed and Sealed this

Sixth Day of September, 2005

JON W. DUDAS
*Director of the United States Patent and Trademark Office*